US011680383B2

(12) United States Patent
Ueda et al.

(10) Patent No.: US 11,680,383 B2
(45) Date of Patent: Jun. 20, 2023

(54) REMOTE CONTROL SYSTEM

(71) Applicant: KOBELCO CONSTRUCTION MACHINERY CO., LTD., Hiroshima (JP)

(72) Inventors: Kazuhiro Ueda, Hiroshima (JP); Yoichiro Yamazaki, Hiroshima (JP); Seiji Saiki, Hiroshima (JP); Ryota Hama, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 420 days.

(21) Appl. No.: 17/055,005

(22) PCT Filed: May 9, 2019

(86) PCT No.: PCT/JP2019/018484
§ 371 (c)(1),
(2) Date: Nov. 12, 2020

(87) PCT Pub. No.: WO2019/225324
PCT Pub. Date: Nov. 28, 2019

(65) Prior Publication Data
US 2021/0214918 A1    Jul. 15, 2021

(30) Foreign Application Priority Data
May 22, 2018  (JP) .............................. JP2018-097778

(51) Int. Cl.
*E02F 9/20*       (2006.01)
*E02F 9/24*       (2006.01)
(Continued)

(52) U.S. Cl.
CPC ............ *E02F 9/205* (2013.01); *E02F 9/2004* (2013.01); *E02F 9/2066* (2013.01); *E02F 9/24* (2013.01);
(Continued)

(58) Field of Classification Search
CPC ....... E02F 9/2004; E02F 9/205; E02F 9/2066; E02F 9/24; E02F 9/26; E02F 9/268;
(Continued)

(56) References Cited

U.S. PATENT DOCUMENTS 6,112,139 A  *  8/2000  Schubert ................. E02F 9/205
                                                          701/1
6,836,982 B1     1/2005  Augustine
(Continued)

FOREIGN PATENT DOCUMENTS

CN        101171153 A      4/2008
CN        105677016 A      6/2016
(Continued)

OTHER PUBLICATIONS

Combined Chinese Office Action and Search Report dated Nov. 3, 2021 in Chinese Patent Application No. 201980031617.0 (with summary English translation), 10 pages.
International Search Report dated Jul. 30, 2019 in PCT/JP2019/018484 filed on May 9, 2019, 2 pages.
Extended European Search Report dated Jun. 23, 2021 in European Patent Application No. 19806391.9, 11 pages.
(Continued)

*Primary Examiner* — Tyler J Lee
(74) *Attorney, Agent, or Firm* — Oblon, McClelland, Maier & Neustadt, L.L.P.

(57) ABSTRACT

On detection of a difference between the operation amount detected by a first sensor and the operation amount received by a first communication unit from a slave, a master side controller executes at least one of stop control to automatically stop a construction machine and alarm control to cause a warning device to issue an alarm. On detection of a difference between the operation amount detected by a
(Continued)

second sensor and the operation amount received by a communication unit from the master, a slave side controller executes at least one of the stop control to automatically stop the construction machine and the alarm control to cause the warning device to issue the alarm.

6 Claims, 4 Drawing Sheets

(51) Int. Cl.
    *E02F 9/26* (2006.01)
    *F02D 41/04* (2006.01)
    *G05D 1/00* (2006.01)
    *G08B 21/18* (2006.01)
    *H04Q 9/02* (2006.01)
    *H04W 84/20* (2009.01)

(52) U.S. Cl.
    CPC .............. *E02F 9/26* (2013.01); *F02D 41/042* (2013.01); *G05D 1/0011* (2013.01); *G08B 21/187* (2013.01); *H04Q 9/02* (2013.01); *H04W 84/20* (2013.01)

(58) Field of Classification Search
    CPC ... F02D 41/042; G05D 1/0011; G08B 21/187; H04Q 9/00; H04Q 9/02; H04W 84/20
    See application file for complete search history.

(56) References Cited

U.S. PATENT DOCUMENTS

| | | | |
|---|---|---|---|
| 9,156,477 B2* | 10/2015 | Cooper | ................... B61C 17/12 |
| 9,560,692 B2* | 1/2017 | McGee | ................ G05D 1/0061 |
| 2005/0060058 A1* | 3/2005 | Cameron | ............... D05B 19/08 700/138 |
| 2015/0198936 A1* | 7/2015 | McGee | ................. H04W 88/00 700/40 |

FOREIGN PATENT DOCUMENTS

| | | |
|---|---|---|
| DE | 10 2014 217 691 A1 | 3/2015 |
| EP | 1 273 719 A1 | 1/2003 |
| EP | 2 381 697 A2 | 10/2011 |
| JP | 7-229168 A | 8/1995 |
| JP | 8-217379 A | 8/1996 |
| JP | 10-252101 A | 9/1998 |
| JP | 11-269938 A | 10/1999 |
| JP | 2003-122430 A | 4/2003 |
| JP | 2006-52547 A | 2/2006 |
| JP | 2007-107305 A | 4/2007 |

OTHER PUBLICATIONS

Le, Q.H., et al., "Remote control of excavator using head tracking and flexibie monitoring method", Automation in Construction, vol. 81, Jun. 15, 2017, XP085112387, pp. 99-111.

* cited by examiner

REMOTE CONTROL SYSTEM

TECHNICAL FIELD

The present invention relates to a remote operation system including a master operation device and a slave operation device.

BACKGROUND ART

In recent years, a remote operation system that remotely operates a construction machine by using a master operation device called master that receives an operation of an operator and a slave operation device called slave that is communicatively connected to the master is known (for example, Patent Literature 1). In such a remote operation system, the master includes a remote operation lever that receives the operation from the operator, and transmits the operation amount received by the remote operation lever to the slave via a communication path. On the other hand, the slave directly operates an operation lever of the construction machine according to the operation amount transmitted from the master.

Here, the slave includes a motor that gives operating power according to the operation amount transmitted from the master to the operation lever of the construction machine. This motor may break down due to overheat and seize up or the like. In this case, there is a possibility that a difference will occur between the operation amount input by the operator into the remote operation lever of the master and the operation amount input by the slave into the operation lever of the construction machine, and that the construction machine will not operate according to the operation amount input by the operator.

Since the master and the slave are connected via the communication path, communication interruption or communication noise may occur. In this case, as in the above case, there is a possibility that the construction machine will not operate according to the operation amount input by the operator. The occurrence of such a situation, which causes interference between the construction machine and objects around the construction machine, needs to be detected promptly.

Patent Literature 2 discloses a technique, for determining an abnormality in a work machine lever operation direction detector of a work vehicle, to compare an actuation direction signal indicating an actuation direction of an actuator of the work vehicle with an operation direction signal indicating a work machine lever operation direction, and to inform the operator of the abnormality if a disagreement signal indicating disagreement continues for a predetermined time or more.

However, Patent Literature 2 has a problem of swiftness deficiency in that since the actuation direction signal is compared with the operation direction signal, the abnormality cannot be detected until the actuator actually starts moving, leading to a situation that it is not possible to avoid interference between the work vehicle and surrounding objects when the abnormality is detected.

CITATION LIST

Patent Literature

Patent Literature 1: JP H10-252101 A
Patent Literature 2: JP H08-217379 A

SUMMARY OF INVENTION

An object of the present invention is to provide a remote operation system that promptly detects that a construction machine is not operating according to an operation amount input into a master operation device.

One aspect of the present invention is a remote operation system for remotely operating a construction machine including an operation member. The remote operation system includes: a master operation device configured to remotely operate the construction machine; and a slave operation device mounted on the construction machine and configured to operate the construction machine based on an operation received by the master operation device. The master operation device includes: a remote operation member configured to receive an operation of an operator; a first sensor configured to detect an operation amount of the remote operation member; a first communication unit configured to transmit the operation amount detected by the first sensor to the slave operation device; and a warning device configured to issue an alarm. The slave operation device includes: a second communication unit configured to receive the operation amount transmitted from the master operation device; an operation mechanism configured to directly operate the operation member of the construction machine; a second sensor configured to detect an operation amount of the operation member of the construction machine; and a slave side controller configured to control the operation mechanism to operate the operation member of the construction machine with the operation amount received by the second communication unit. On detection of a difference between the operation amount detected by the second sensor and the operation amount received by the second communication unit, the slave side controller executes at least one of stop control to automatically stop the construction machine and alarm control to cause the warning device to issue the alarm.

The present invention makes it possible to promptly detect that the construction machine is not operating according to the operation amount input into the master operation device.

DESCRIPTION OF EMBODIMENTS

Figure 1:
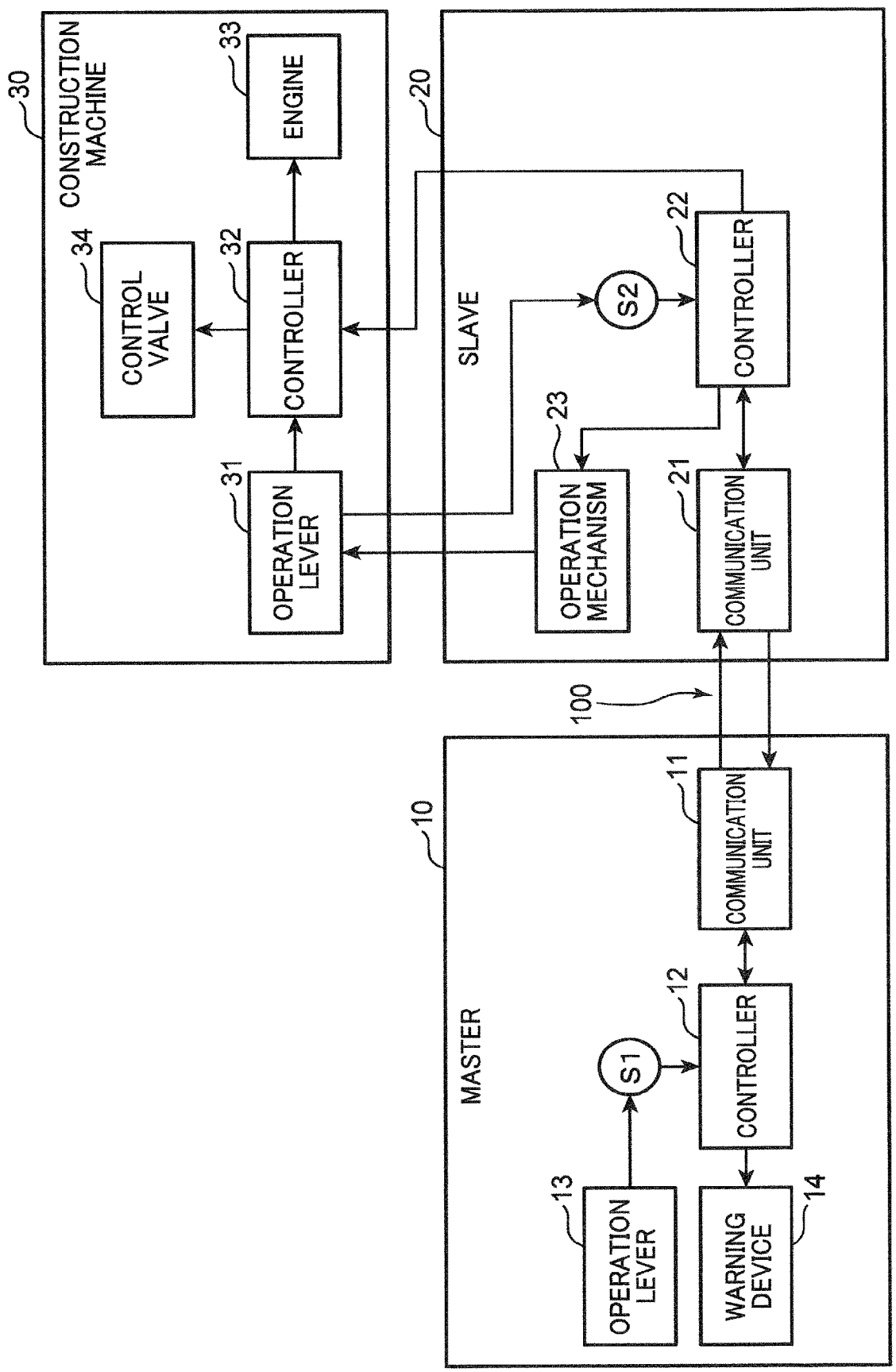
FIG. 1 is a block diagram showing an overall configuration of a remote operation system according to an embodiment of the present invention.

FIG. 1 is a block diagram showing an overall configuration of a remote operation system according to an embodiment of the present invention. The remote operation system includes a master 10 and a slave 20. The master 10 is a master operation device for directly receiving an operation of an operator and remotely operating a construction machine 30. In the present embodiment, the master 10 includes an operation device simulating a cab of the construction machine 30. An operation lever 13 similar to an operation lever 31 of the construction machine 30 is disposed at a position similar to a position of the construction machine 30. Also, the master 10 includes a seat on which the operator is seated, and a display device that is disposed forward of the seat and displays an image around the construction machine 30. The operator operates the operation lever 13 to remotely operate the construction machine while looking at the surrounding image displayed on the display device.

The slave 20 is a slave operation device that is disposed in the cab of the construction machine 30 and directly operates the operation lever 31 of the construction machine 30 based on the operation amount received by the master 10. The slave 20 is, in a sense, a machine that operates the construction machine 30 as an operator's dummy.

The master 10 and the slave 20 are communicatively connected to each other via a communication path 100. As the communication path 100, a communication path is employed that allows wireless communication between the slave 20 and the master 10 at a distance of several tens to several hundreds of meters, such as specific low power radio and Bluetooth (registered trademark). However, this is one example, and as the communication path 100, a public communication line including a mobile phone communication network, an Internet communication network, or the like may be employed. In this case, the master 10 and the slave 20 can perform long-distance communication. Alternatively, wired communication may be employed as the communication path 100.

Figure 2:
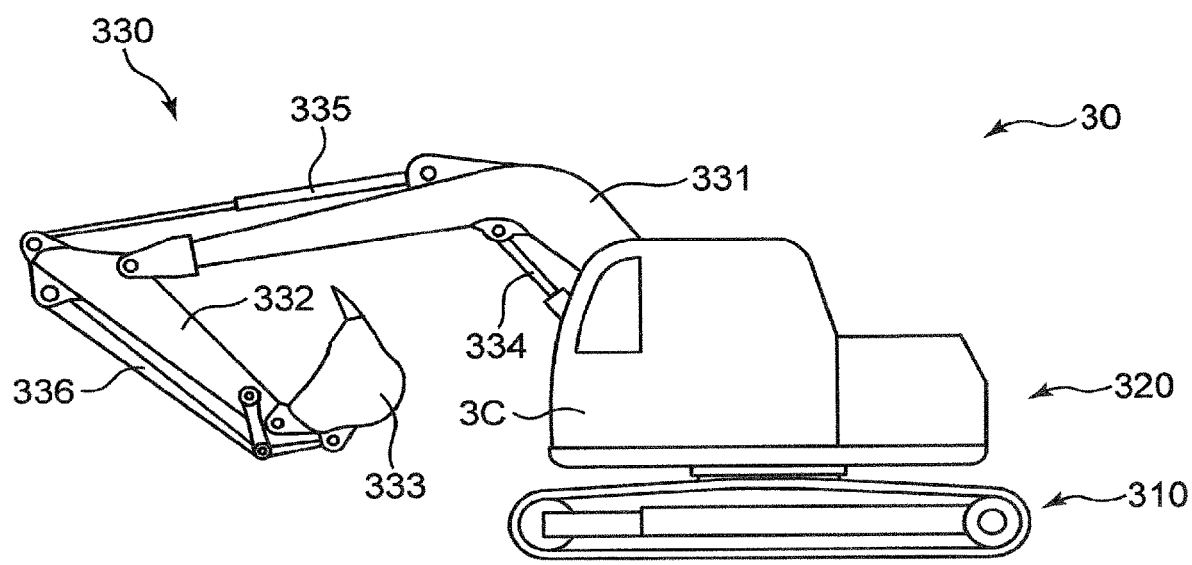
FIG. 2 is a view showing external appearance of a construction machine shown in FIG. 1.

FIG. 2 is a view showing external appearance of the construction machine 30 shown in FIG. 1. The construction machine 30 shown in FIG. 2 includes a hydraulic excavator. The construction machine 30 includes a crawler-type lower travelling body 310, an upper slewing body 320 rotatably provided on the lower travelling body 310, and a work device 330 attached to the upper slewing body 320.

The work device 330 includes a boom 331 attached to the upper slewing body 320 so as to enable raising and lowering, an arm 332 swingably attached to a tip of the boom 331, and an attachment 333 swingably attached to a tip of the arm 332.

In addition, the work device 330 includes a boom cylinder 334 that raises and lowers the boom 331 with respect to the upper slewing body 320, an arm cylinder 335 that swings the arm 332 with respect to the boom 331, and an attachment cylinder 336 that swings the attachment 333 with respect to the aim 332. The upper slewing body 320 includes a cab 3C the operator goes aboard.

Reference is returned to FIG. 1. The master 10 includes a communication unit 11 (one example of first communication unit), a controller 12 (one example of master side controller), the operation lever 13 (one example of remote operation member), a warning device 14, and a sensor S1 (one example of first sensor).

The communication unit 11 includes a communication device compatible with the communication method employed by the communication path 100. The communication unit 11 transmits the operation amount of the operation lever 13 detected by the sensor S1 to the slave 20, and also receives the operation amount of the operation lever 31 transmitted from the slave 20 and detected by a sensor S2. Here, the communication unit 11 transmits, under the control of the controller 12, the operation amount detected by the sensor S1 to the slave 20 at a predetermined sampling interval. Note that even if the operation amount detected by the sensor S1 is 0, the communication unit 11 is required at least to transmit the operation amount detected by the sensor S1 to the slave 20 at the predetermined sampling interval.

The controller 12 includes a computer including a processor such as a CPU or an ASIC, and a storage device such as a ROM and a RAM. On detection of a difference between the operation amount detected by the sensor S1 and the operation amount received by the communication unit 11 from the slave 20, the controller 12 executes at least one of stop control to automatically stop the construction machine 30 and alarm control to cause the warning device 14 to issue an alarm.

Here, the controller 12 may determine that there is not a difference when the operation amount detected by the sensor S1 completely agrees with the operation amount received by the communication unit 11, or may determine that there is a difference when the difference between both operation amounts is equal to or larger than a predetermined allowable value. As the allowable value, the maximum value of a value with which both operation amounts can be regarded as substantially the same can be employed. This makes it possible to prevent these types of control from being executed in a case where it is originally unnecessary to execute the stop control and the alarm control.

In addition, when it is continuously detected for a certain time or longer that there is a difference between both operation amounts, the controller 12 may determine that there is a difference. As the certain time, for example, a time during which it can be considered that some failure occurs in the communication path 100, and a time during which it can be considered that the operation lever 31 has become unable to return to a neutral position due to a breakdown of an operation mechanism 23 or the like can be employed. This makes it possible to prevent the stop control and the alarm control from being executed because a temporary difference occurs between both operation amounts due to some factor, and to avoid frequent occurrence of these types of control.

If the reception, by the communication unit 11, of the operation amount transmitted from the slave 20 at a predetermined sampling interval is interrupted, the controller 12 detects the communication interruption and executes at least one of the stop control and the alarm control.

Note that when executing the stop control, the controller 12 is required to transmit a stop control command to automatically stop the construction machine 30 to the slave 20 by using the communication unit 11.

The operation lever 13 corresponds to the operation lever 31 included in the construction machine 30, and receives the operation from the operator who remotely operates the construction machine 30. The present embodiment describes the operation lever 13 as an operation lever that receives the operation of the operator for operating the work device 330 of the construction machine 30. For example, the operation lever 13 may include an attachment (ATT) lever that is tiltable in four directions of front, rear, right, and left, and causes the boom 331 to fall when tilted forward, causes the boom 331 to rise when tilted rearward, causes the attachment 333 to swing on the driver's seat side when tilted leftward, and causes the attachment 333 to swing on the opposite side from the driver's seat when tilted rightward. Alternatively, the operation lever 13 may include a travel lever that moves the construction machine 30 forward or rearward. Alternatively, the operation lever 13 may include a slewing lever that is tiltable in four directions of front, rear, right, and left, swings the arm 332, and clews the upper stewing body 320. Alternatively, the operation lever 13 may include three operation levers, an ATT lever, a travel lever, and a slewing lever. In any case, the operation lever 13 includes various operation levers to support various operation levers included in the operation lever 31 of the construction machine 30.

The sensor S1 includes, for example, a potentiometer-type sensor, detects the operation amount of the operation lever 13, and outputs the operation amount to the controller 12. Here, the sensor S1 individually detects each of the front, rear, right, and left operation amounts of the operation lever 13 and outputs the operation amounts to the controller 12. Note that as the tilt amount of the operation lever 13 increases in each of the front, rear, right, and left directions, the sensor S1 increases the operation amount to detect. Note that if the operation lever 13 includes a plurality of operation levers, the sensor S1 includes a plurality of sensors corresponding to the operation levers.

The slave 20 includes a communication unit 21 (one example of second communication unit), a controller 22 (one example of slave side controller), the operation mechanism 23, and the sensor S2 (one example of second sensor).

The communication unit 21 includes a communication device compatible with the communication method employed by the communication path 100, receives the operation amount transmitted from the master 10, and transmits the operation amount of the operation lever 31 detected by the sensor S2 to the master 10. Here, the communication unit 21, under the control of the controller 22, transmits the operation amount detected by the sensor S2 to the master 10 at a predetermined sampling interval. Note that even if the operation amount detected by the sensor S2 is 0, the communication unit 21 is required at least to transmit the operation amount detected by the sensor S2 to the master 10 at the predetermined sampling interval.

The controller 22 includes a computer including a processor such as a CPU or an ASIC, and a storage device such as a ROM and a RAM. The controller 22 outputs, to the operation mechanism 23, a control signal for generating operating power according to the operation amount received by the communication unit 21 from the master 10. With this operation, the operating power according to the operation amount input by the operator is given to the operation lever 31 of the construction machine 30, and the construction machine 30 is remotely operated.

On detection of a difference between the operation amount detected by the sensor S2 and the operation amount received by the communication unit 21 from the master 10, the controller 22 executes at least one of the stop control to automatically stop the construction machine 30 and the alarm control to cause the warning device 14 to issue an alarm.

Here, in a similar manner to the controller 12, the controller 22 may determine that there is not a difference when the operation amount detected by the sensor S2 completely agrees with the operation amount received by the communication unit 21, or may determine that there is a difference when the difference between both operation amounts is equal to or larger than a predetermined allowable value. In addition, in a similar manner to the controller 12, when it is continuously detected for a certain time or longer that there is a difference between both operation amounts, the controller 22 may determine that there is a difference.

If the reception, by the communication unit 21, of the operation amount transmitted from the master 10 at a predetermined sampling interval is interrupted, the controller 22 detects the communication interruption and executes at least one of the stop control and the alarm control.

Note that when executing the alarm control, the controller 22 is required to transmit an alarm control command to the master 10 by using the communication unit 21.

The operation mechanism 23 includes an actuator such as a motor, receives the control signal from the controller 22 for generating the operating power according to the operation amount received by the communication unit 21, generates the operating power according to the operation amount, and gives the operating power to the operation lever 31 of the construction machine 30. For example, if the operation lever 31 includes an ATT lever, a travel lever, and a stewing lever, the operation mechanism 23 includes three operation mechanisms corresponding to the operation levers. In this example, if the ATT lever includes an operation lever tiltable in four directions of front, rear, right, and left, the operation mechanism 23 includes an actuator that tilts the ATT lever in the front-rear direction and an actuator that tilts the ATT lever in the right-left direction.

The sensor S2 includes a potentiometer-type sensor attached to the operation lever 31, detects the tilt amount of the operation lever 31, and outputs the operation amount corresponding to the tilt amount to the controller 22. Here, the sensor S2 individually detects each of the front, rear, right, and left tilt amounts of the operation lever 31 and outputs the tilt amounts to the controller 22. Note that as the tilt amount of the operation lever 31 increases in each of the front, rear, right, and left directions, the sensor S2 increases the operation amount to output. Note that if the operation lever 31 includes a plurality of operation levers, the sensor S2 includes a plurality of sensors corresponding to the operation levers.

The construction machine 30 includes the operation lever 31 (one example of operation member), a controller 32, an engine 33, and a control valve 34.

The operation lever 31 is provided in the cab 3C of the construction machine 30, and is tilted by applying the operating power from the operation mechanism 23 of the slave 20. The operation lever 31 includes at least one or more of ATT lever, travel lever, and slewing lever, in a similar manner to the operation lever 13 of the master 10. In this case, at least one or more of ATT lever and slewing lever that constitute the operation lever 31 include an operation lever tiltable in four directions of front, rear, right, and left, in a similar manner to the ATT lever and the slewing lever that constitute the operation lever 13 of the master 10. The travel lever that constitutes the operation lever 31 includes an operation lever tiltable in two directions of front and rear, in a similar manner to the travel lever that constitutes the operation lever 13 of the master 10.

The controller 32 includes a processor such as a CPU and an ASIC and a storage device such as a ROM, and manages the overall control of the construction machine 30. On receipt of the stop control command from the controller 22 of the slave 20, the controller 32 executes the stop control to automatically stop the construction machine 30. The stop control includes control to automatically stop the engine 33 and control to close the control valve 34. When executing the control to automatically stop the engine 33, the controller 32 gradually decreases the rotation speed of the engine 33 to a rotation speed in an idle state, and then stops the engine. When executing the control to close the control valve 34, the controller 32 may control the control valve 34 such that the valve opening degree of the control valve 34 is gradually closed. With this operation, the construction machine 30 can be automatically stopped without giving a shock.

The engine 33 is a drive source for the construction machine 30 and drives a hydraulic pump. The control valve 34 includes, for example, the boom cylinder 334, the arm cylinder 335, the attachment cylinder 336, and the like. The control valve 34 operates according to a hydraulic fluid discharged from the hydraulic pump to change the posture of the work device 330.

Figure 3:
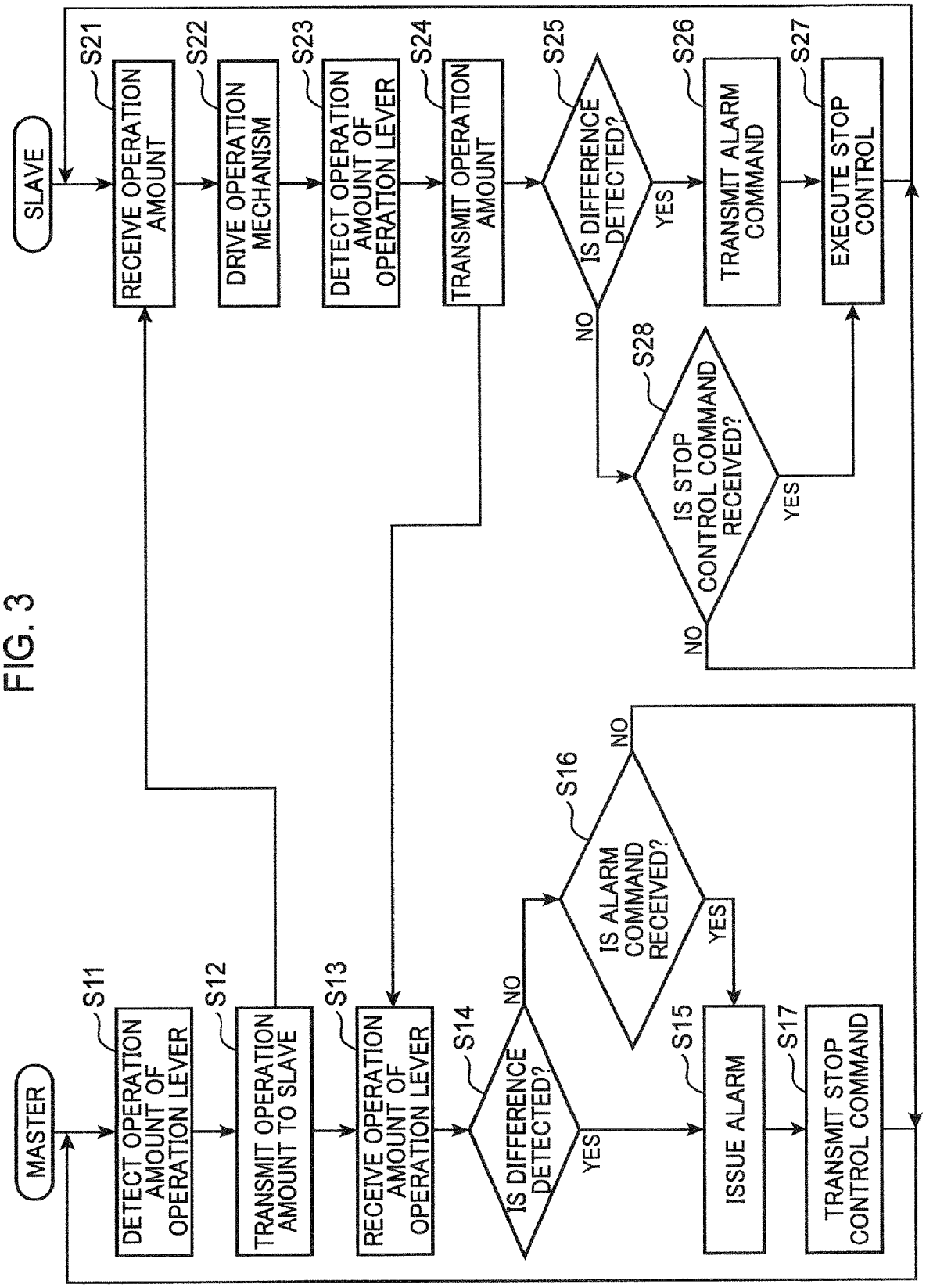
FIG. 3 is a flowchart showing one example of processing of the remote operation system according to the embodiment of the present invention.

FIG. 3 is a flowchart showing one example of processing of the remote operation system according to the embodiment of the present invention. In S11, the sensor S1 of the master 10 detects the operation amount of the operation lever 13. In S12, the controller 12 passes the operation amount detected by the sensor S1 to the communication unit 11, and the communication unit 11 transmits the operation amount detected by the sensor S1 to the slave 20.

In S21, the communication unit 21 of the slave 20 receives the operation amount transmitted from the master 10. In S22, the controller 22 of the slave 20 outputs the control signal that generates the operating power that tilts the operation lever 31 of the construction machine 30 according to the operation amount received in S21 to the operation mechanism 23. The operation mechanism 23 generates the operating power according to the control signal and tilts the operation lever 31.

In S23, the sensor S2 of the slave 20 detects the operation amount of the operation lever 31. In S24, the controller 22 of the slave 20 passes the operation amount detected by the sensor S2 to the communication unit 21, and the communication unit 21 transmits the received operation amount to the master 10.

In S13, the communication unit 11 of the master 10 receives the operation amount transmitted from the slave 20. In S14, the controller 12 detects whether there is a difference between the operation amount of the operation lever 13 detected in S11 and the operation amount received in S13. Then, when a difference is detected (YES in S14), the controller 12 causes the warning device 14 to issue an alarm (S15). Here, as the alarm, at least one of a mode of lighting a warning lighting lamp physically provided in the master 10, a mode of displaying an image of the lighting lamp on the display device of the master 10, and a mode of outputting a warning sound from a speaker provided in the master 10 can be employed.

In S17, the controller 12 passes the stop control command to automatically stop the construction machine 30 to the communication unit 11, and the communication unit 11 transmits the stop control command to the slave 20. When the process of S17 ends, the process returns to S11.

On the other hand, if no difference is detected (NO in S14), the controller 12 determines whether the communication unit 11 has received an alarm command from the slave 20 (S16). If the communication unit 11 receives the alarm command from the slave 20 (YES in S16), the warning device 14 issues an alarm (S15).

On the other hand, if the communication unit 11 does not receive the alarm command from the slave 20 (NO in S16), the process returns to S11.

In S25, the controller 22 of the slave 20 detects whether there is a difference between the operation amount of the operation lever 13 received in S21 and the operation amount of the operation lever 31 detected in S23. Then, when a difference is detected (YES in S25), the controller 22 passes, to the communication unit 21, the alarm command to cause the warning device 14 of the master 10 to issue an alarm, and the communication unit 21 transmits the alarm command to the master 10 (S26).

In S27, the controller 22 executes the stop control. This causes the operation of the construction machine 30 to be automatically stopped. When the process of S27 ends, the process returns to S21.

On the other hand, if no difference is detected (NO in S25), the controller 22 determines whether the communication unit 21 has received the stop control command from the master 10 (S28). If the communication unit 21 has received the stop control command from the master 10 (YES in S28), the stop control is executed (S27). On the other hand, if the communication unit 21 has not received the stop control command from the master 10 (NO in S28), the process returns to S21.

Next, specific examples of the present embodiment will be described.

(1) Breakdown of Operation Lever 31 of Construction Machine 30

If the motor constituting the operation mechanism 23 breaks down due to overheat and seize up or the like, or if some foreign matter enters the operation lever 31, the operation mechanism 23 cannot return the operation lever 31 from a tilted posture to a neutral position, or cannot tilt the operation lever 31 from a neutral position to a tilted posture. In particular, when the operation lever 31 cannot return from a tilted posture to a neutral position, the operator cannot operate the construction machine 30 as intended.

For example, because of a breakdown, if the operation lever 31 fails to return to a neutral position from a state of maintaining a tilted posture corresponding to the operation amount "15", even if the operator inputs the operation amount "10" into the operation lever 13 of the master 10, the operation amount "15" remains input into the construction machine 30. Therefore, a difference occurs between the operation amount input into the operation lever 13 and the operation amount input into the operation lever 31. In this case, the sensor S1 detects the operation amount "10", but the slave 20 transmits the operation amount "15". Therefore, the controller 12 of the master 10 detects the difference between both operation amounts. Meanwhile, the sensor S2 detects the operation amount "15", but the master 10 transmits the operation amount "10". Therefore, the controller 22 of the slave 20 detects the difference between both operation amounts.

Here, if a mode is employed in which the controller 22 of the slave 20 does not detect this difference and only the controller 12 of the master 10 detects this difference, in order to stop the construction machine 30 automatically, the controller 12 of the master 10 needs to transmit the stop control command to the slave 20 via the communication path 100 after detecting the difference between both operation amounts, causing a time lag accordingly.

In contrast, in the present embodiment, not only the master 10 but also the controller 22 of the slave 20 detects the difference between both operation amounts. Therefore, the construction machine 30 can be automatically stopped promptly.

Conversely, if a configuration is employed in which the controller 12 of the master 10 does not detect this difference and only the controller 22 of the slave 20 detects this difference, in order to cause the warning device 14 to issue an alarm, the controller 22 of the slave 20 needs to transmit the alarm command to the master 10 via the communication path 100 after detecting the difference between both operation amounts, causing a time lag accordingly.

In contrast, in the present embodiment, not only the slave 20 but also the controller 12 of the master 10 detects the difference between both operation amounts, and thus the alarm can be promptly issued.

(2) Communication Interruption

For example, in a state where the operation lever 31 is tilted, if some failure occurs in the communication path 100, causing a communication interruption that interrupts the communication between the master 10 and the slave 20, the operator cannot operate the construction machine 30 as intended.

In this case, consider a case where a mode is employed in which the controller 22 of the slave 20 does not detect the difference between both operation amounts, and only the controller 12 of the master 10 detects the difference between both operation amounts. If a communication interruption occurs, the communication unit 11 of the master 10 cannot receive the operation amount from the slave 20 at a predetermined sampling interval, enabling detection of the communication interruption. However, if a communication interruption occurs, the master 10 cannot transmit the stop control command to the slave 20, and thus cannot automatically stop the construction machine 30.

In contrast, in the present embodiment, not only the master 10 but also the controller 22 of the slave 20 detects the difference between both operation amounts. Here, if a communication interruption occurs, the communication unit 21 of the slave 20 cannot receive the operation amount transmitted from the master 10 at a predetermined sampling interval, enabling the controller 22 of the slave 20 to detect the communication interruption. In this case, the controller 22 of the slave 20 is required at least to automatically stop the construction machine 30. As a result, it can be avoided that the construction machine 30 does not operate as intended by the operator.

Conversely, if a configuration is employed in which the controller 12 of the master 10 does not detect a communication interruption and only the controller 22 of the slave 20 detects the communication interruption, the controller 22 of the slave 20 cannot transmit the alarm command to the master 10, and thus the alarm cannot be issued.

In contrast, in the present embodiment, not only the slave 20 but also the controller 12 of the master 10 detects a communication interruption, and thus the alarm can be promptly issued.

(3) Communication Noise

Since the master 10 and the slave 20 are connected via the communication path 100, communication noise may be mixed in the operation amount received by the communication unit 11 and the communication unit 21, and the received operation amount may be different from the original operation amount in value. Also in this case, as in the case of (1), a difference occurs between both operation amounts, disabling the operator from operating the construction machine 30 as intended. In the present embodiment, when the difference between both operation amounts is detected as described above, the stop control and the alai in control are executed, avoiding such a situation.

As described above, according to the present embodiment, instead of the actual amount of movement of the construction machine 30, the operation amount input by the operation mechanism 23 of the slave 20 into the operation lever 31 of the construction machine 30 is compared with the operation amount input by the operator into the operation lever 13 of the master 10, and the difference between both operation amounts is detected. This makes it possible to promptly detect whether the construction machine 30 is operating according to the operation amount input by the operator.

Note that the present invention can employ the following modifications.

(1) On detection of a communication interruption, if the period of the communication interruption is equal to or less than a certain period, the controller 12 of the master 10 may detect the difference by interpolating the operation amount of which reception has failed in a certain period and comparing the interpolated operation amount with the operation amount detected by the sensor S1. On detection of a communication interruption, if the period of the communication interruption is equal to or less than a certain period, the controller 22 of the slave 20 may detect the difference by interpolating the operation amount of which reception has failed in a certain period and comparing the interpolated operation amount with the operation amount detected by the sensor S2.

Here, each of the controller 12 and the controller 22 may interpolate the operation amount by using the operation amount at one sample point immediately before the communication interruption, may interpolate the operation amount by using an average value of the operation amounts at several sample points immediately before the communication interruption, or may interpolate the operation amount by inferring the operation amount at each sample point in the interpolation section from variation pattern of the operation amounts of several samples immediately before the communication interruption.

(2) When the mode of interpolation shown in (1) is employed, each of the controller 12 and the controller 22 may execute the stop control and the alarm control when the period of occurrence of the communication interruption exceeds a certain period.

(3) The above embodiment has described that the sensor S2 includes a potentiometer-type sensor attached to the operation lever 31 of the construction machine 30, but the present invention is not limited thereto. The sensor S2 may be included in the operation mechanism 23 as shown in FIG. 4.

Figure 4:
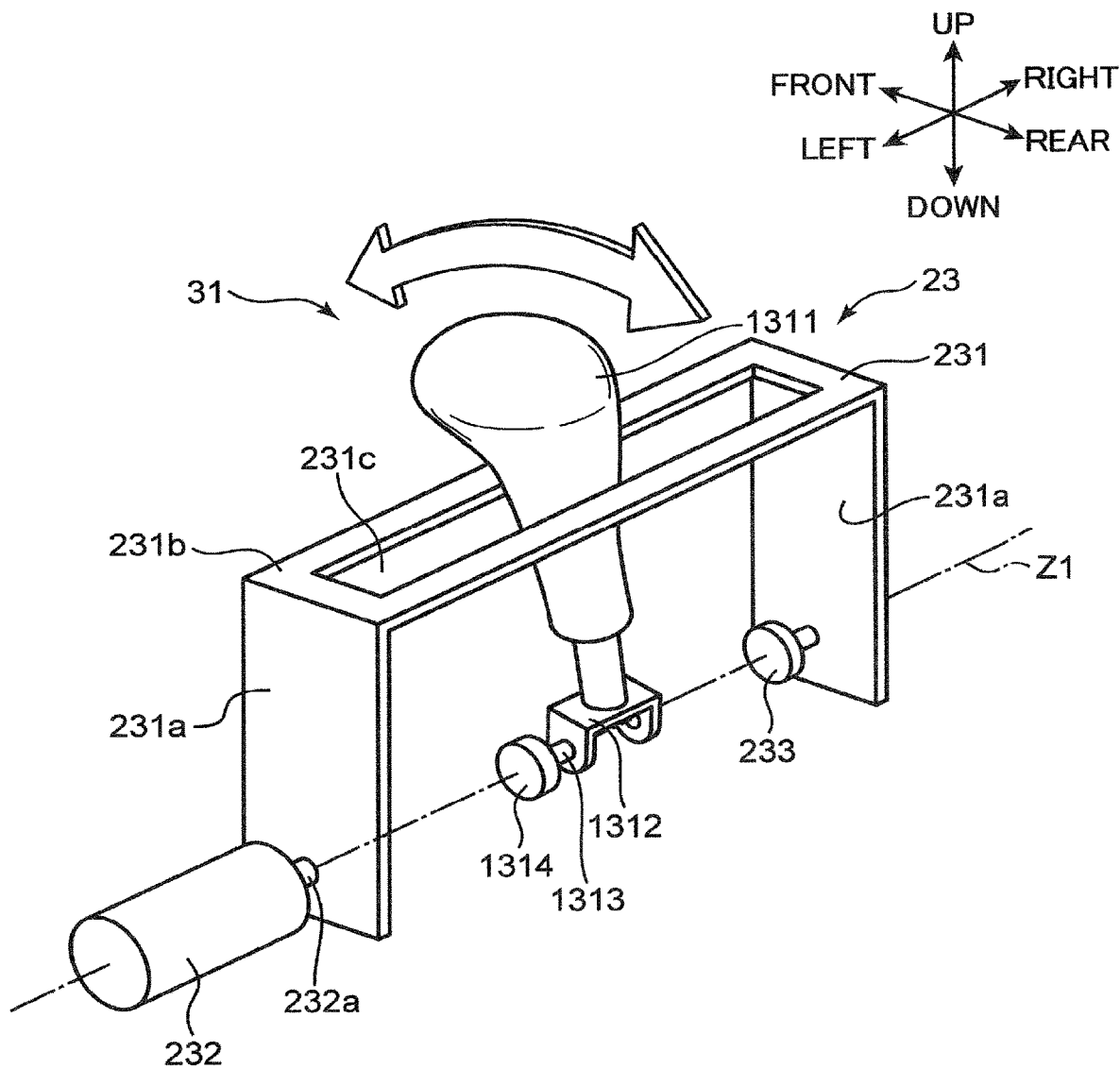
FIG. 4 is a view showing an example of attaching a sensor when an operation mechanism includes the sensor in the present invention.

FIG. 4 is a view showing an example of attaching the sensor S2 when the operation mechanism 23 includes the sensor S2 in the present invention.

The operation lever 31 includes a grip part 1311 extending in the up-down direction and configured to be gripped by the operator, a holding part 1312 that holds the grip part 1311 tiltably around a rotation axis Z1, and an encoder 1314 provided on a side surface of the holding part 1312 for detecting the tilt amount of the operation lever 31. The encoder 1314 is a sensor originally provided in the construction machine 30 for detecting the operation amount of the operation lever 31.

The operation mechanism 23 includes an operation member 231 that gives operating power to the operation lever 31, a motor 232 that tilts the operation member 231 around the rotation axis Z1, and an encoder 233 provided on a side wall 231*a* of the operation member 231. In FIG. 4, the encoder 233 corresponds to one example of the sensor S2.

The operation member 231 includes a pair of side walls 231*a* standing upright in the up-down direction and a flat board-shaped upper wall 231*b* connecting the upper ends of the pair of side walls 231*a* and extending in the right-left direction. The upper wall 231*b* includes a hole 231*c* that is opened in a portion other than an outer frame. The hole 231*c* has a strip shape extending in the right-left direction, and the operation lever 31 is passed through the hole 231*c*. The front-rear width of the hole 231*c* is set at the front-rear width of the up-down middle portion of the grip part 1311 with some margin added.

A rotation shaft 232a of the motor 232 is connected to the side wall 231a. Then, on receipt of the control signal for generating the operating power according to the operation amount of the operator of the master 10 from the controller 22, the motor 232 tilts the operation member 231 at a tilt angle according to the operation amount. The tilting of the operation member 231 causes the operation lever 31 to be tilted around the rotation axis Z1 at the tilt angle according to the operation amount of the operator.

When the operation member 231 tilts, the encoder 233 detects the tilt angle of the operation member 231 as the operation amount of the operation lever 31, and outputs the tilt angle to the controller 22.

By employing the encoder 233 as the sensor S2 in this way, the operation amount of the operation lever 31 can be detected without electrically connecting the existing encoder 1314 originally provided in the construction machine 30 to the controller 22 of the slave 20. As a result, the slave 20 can detect the operation amount of the operation lever 31 without changing the existing configuration of the construction machine 30.

Note that front, rear, up, down, left, and right arrows shown in FIG. 4 are provided for convenience of description of FIG. 4, and do not necessarily correspond to the front, rear, up, down, left, and right directions of the construction machine 30.

If the operation lever 31 is tiltable around a rotation axis in the front-rear direction orthogonal to the rotation axis Z1 in FIG. 4, the operation member 231 corresponding to the front-rear direction may be further provided for the operation lever 31. In this case, the operation member 231 corresponds to the front-rear direction may be attached to the operation lever 31 such that, for example, the longitudinal direction of the hole 231c points in the front-rear direction.

CONCLUSION OF EMBODIMENT

One aspect of the present invention is a remote operation system for remotely operating a construction machine including an operation member. The remote operation system includes: a master operation device configured to remotely operate the construction machine; and a slave operation device mounted on the construction machine and configured to operate the construction machine based on an operation received by the master operation device. The master operation device includes: a remote operation member configured to receive an operation of an operator; a first sensor configured to detect an operation amount of the remote operation member; a first communication unit configured to transmit the operation amount detected by the first sensor to the slave operation device; and a warning device configured to issue an alarm. The slave operation device includes: a second communication unit configured to receive the operation amount transmitted from the master operation device; an operation mechanism configured to directly operate the operation member of the construction machine; a second sensor configured to detect an operation amount of the operation member of the construction machine; and a slave side controller configured to control the operation mechanism to operate the operation member of the construction machine with the operation amount received by the second communication unit. On detection of a difference between the operation amount detected by the second sensor and the operation amount received by the second communication unit, the slave side controller executes at least one of stop control to automatically stop the construction machine and alarm control to cause the warning device to issue the alarm.

With this configuration, instead of the actual amount of movement of the construction machine, the operation amount input by the operation mechanism of the slave operation device into the operation member of the construction machine (operation amount detected by the second sensor) is compared with the operation amount input by the operator into the remote operation member of the master operation device (operation amount received by the second communication unit), and the difference between both operation amounts is detected. Therefore, it is possible to promptly detect whether the construction machine is operating according to the operation amount input by the operator.

Also, with this configuration, the slave side controller mounted on the construction machine detects the difference between both operation amounts. Therefore, when the operation member of the construction machine becomes inoperable due to a breakdown of the slave operation device or the like and the difference occurs, the difference can be detected promptly. Furthermore, the slave side controller detects the difference, making it possible to promptly execute the stop control to automatically stop the construction machine.

In the above configuration, preferably, the first communication unit receives the operation amount detected by the second sensor, and the master operation device further includes a master side controller that executes the stop control and the alarm control on detection of a difference between the operation amount detected by the first sensor and the operation amount received by the first communication unit.

With this configuration, the master side controller provided in the master operation device detects the difference between the operation amount input by the operator into the remote operation member of the master operation device (operation amount detected by the first sensor), and the operation amount input by the operation mechanism of the slave operation device into the operation member of the construction machine (operation amount received by the first communication unit). Therefore, it is possible to cause the warning device provided in the master operation device to issue the alarm promptly.

In the above configuration, when the difference is continuously detected for a certain time or more, each of the master side controller and the slave side controller preferably executes at least one of the stop control and the alarm control.

With this configuration, the stop control and the alarm control are executed when the detection of the difference between the operation amount input by the operator into the remote operation member of the master operation device and the operation amount input by the operation mechanism of the slave operation device into the operation member of the construction machine continues for a certain time or more. Therefore, both types of control can be executed when really needed.

In the above configuration, preferably, on detection of a communication interruption between the master operation device and the slave operation device, the master side controller executes the stop control by transmitting a stop control command to automatically stop the construction machine to the slave operation device by using the first communication unit, and executes the alarm control, and on detection of the communication interruption between the master operation device and the slave operation device, the slave side controller executes the stop control, and executes the alarm control by transmitting an alarm command to cause the warning device to issue the alarm to the master operation device by using the second communication unit.

In a case where a communication interruption occurs, even if the master side controller can detect the communication interruption, the master side controller cannot transmit the stop command to automatically stop the construction machine to the slave operation device, and therefore cannot stop the construction machine automatically. With this configuration, the slave side controller also detects the communication interruption and executes the stop control, making it possible to prevent the construction machine from being unable to be automatically stopped when the communication interruption occurs.

In a case where the communication interruption occurs, even if the slave side controller can detect the communication interruption, the slave side controller cannot transmit, to the master operation device, the alarm command to cause the warning device provided in the master operation device to issue the alarm, and thus the alarm cannot be issued. With this configuration, the master side controller also detects the communication interruption and issues the alarm, making it possible to prevent the alarm from being unable to be issued when the communication interruption occurs.

In the above configuration, preferably, control to automatically stop the construction machine is control to gradually decrease an engine speed of the construction machine to an idle state and then stop the engine.

This configuration can prevent the engine from being stopped suddenly and a shock from being given to the construction machine.

Another aspect of the present invention is a remote operation system for remotely operating a construction machine including an operation member. The remote operation system includes: a master operation device configured to remotely operate the construction machine; and a slave operation device mounted on the construction machine and configured to operate the construction machine based on an operation received by the master operation device, wherein the master operation device includes: a remote operation member configured to receive an operation of an operator; a first sensor configured to detect an operation amount of the remote operation member; a first communication unit configured to transmit the operation amount detected by the first sensor to the slave operation device; and a warning device configured to issue an alarm, the slave operation device includes: a second communication unit configured to receive the operation amount transmitted from the master operation device; an operation mechanism configured to directly operate the operation member of the construction machine; a second sensor configured to detect an operation amount of the operation member of the construction machine; and a slave side controller configured to control the operation mechanism to operate the operation member of the construction machine with the operation amount received by the second communication unit, the master operation device further includes a master side controller that executes at least one of stop control to automatically stop the construction machine and alarm control to cause the warning device to issue the alarm on detection of a difference between the operation amount detected by the first sensor and the operation amount received by the first communication unit.

With this configuration, instead of the actual amount of movement of the construction machine, the operation amount input by the operation mechanism of the slave operation device into the operation member of the construction machine (operation amount received by the first communication unit) is compared with the operation amount input by the operator into the remote operation member of the master operation device (operation amount detected by the first sensor), and the difference between both operation amounts is detected. Therefore, it is possible to detect whether the construction machine is operating according to the operation amount input by the operator. As a result, this detection can be performed promptly.

Also, with this configuration, the master side controller provided in the master operation device detects the difference between the operation amount input by the operator into the remote operation member of the master operation device (operation amount detected by the first sensor), and the operation amount input by the operation mechanism of the slave operation device into the operation member of the construction machine (operation amount received by the first communication unit). Therefore, it is possible to cause the warning device provided in the master operation device to issue the alarm promptly.

The invention claimed is:

1. A remote operation system for remotely operating a construction machine including an operation member, the remote operation system comprising:
  a master operation device configured to remotely operate the construction machine; and
  a slave operation device mounted on the construction machine and configured to operate the construction machine based on an operation received by the master operation device,
  wherein the master operation device includes:
    a remote operation member configured to receive an operation of an operator;
    a first sensor configured to detect an operation amount of the remote operation member;
    a first communication unit configured to transmit the operation amount detected by the first sensor to the slave operation device; and
    a warning device configured to issue an alarm,
  the slave operation device includes:
    a second communication unit configured to receive the operation amount transmitted from the master operation device;
    an operation mechanism configured to directly operate the operation member of the construction machine;
    a second sensor configured to detect an operation amount of the operation member of the construction machine; and
    a slave side controller configured to control the operation mechanism to operate the operation member of the construction machine with the operation amount received by the second communication unit, and
  on detection of a difference between the operation amount detected by the second sensor and the operation amount received by the second communication unit, the slave side controller executes at least one of stop control to automatically stop the construction machine and alarm control to cause the warning device to issue the alarm.

2. The remote operation system according to claim 1, wherein
  the first communication unit receives the operation amount detected by the second sensor, and
  the master operation device further includes a master side controller that executes the stop control and the alarm control on detection of a difference between the operation amount detected by the first sensor and the operation amount received by the first communication unit.

3. The remote operation system according to claim 2, wherein when the difference is continuously detected for a certain time or more, each of the master side controller and the slave side controller executes the stop control and the alarm control.

4. The remote operation system according to claim 2, wherein
- on detection of a communication interruption between the master operation device and the slave operation device, the master side controller executes the stop control by transmitting a stop control command to automatically stop the construction machine to the slave operation device by using the first communication unit, and executes the alarm control, and
- on detection of the communication interruption between the master operation device and the slave operation device, the slave side controller executes the stop control, and executes the alarm control by transmitting an alarm command to cause the warning device to issue the alarm to the master operation device by using the second communication unit.

5. The remote operation system according to claim 1, wherein control to automatically stop the construction machine is control to gradually decrease an engine speed of the construction machine to an idle state and then stop the engine.

6. A remote operation system for remotely operating a construction machine including an operation member, the remote operation system comprising:
- a master operation device configured to remotely operate the construction machine; and
- a slave operation device mounted on the construction machine and configured to operate the construction machine based on an operation received by the master operation device, wherein the master operation device includes:
- a remote operation member configured to receive an operation of an operator;
- a first sensor configured to detect an operation amount of the remote operation member;
- a first communication unit configured to transmit the operation amount detected by the first sensor to the slave operation device; and
- a warning device configured to issue an alarm, the slave operation device includes:
- a second communication unit configured to receive the operation amount transmitted from the master operation device;
- an operation mechanism configured to directly operate the operation member of the construction machine;
- a second sensor configured to detect an operation amount of the operation member of the construction machine; and
- a slave side controller configured to control the operation mechanism to operate the operation member of the construction machine with the operation amount received by the second communication unit, and the master operation device further includes a master side controller that executes at least one of stop control to automatically stop the construction machine and alarm control to cause the warning device to issue the alarm on detection of a difference between the operation amount detected by the first sensor and the operation amount received by the first communication unit.

* * * * *